(12) United States Patent
Baum et al.

(10) Patent No.: US 6,400,707 B1
(45) Date of Patent: Jun. 4, 2002

(54) REAL TIME FIREWALL SECURITY

(75) Inventors: Robert T. Baum, Gaithersburg;
Edward M. Eggerl, Catonsville;
William R. Burton, Ashton, all of MD
(US); Leo C. Cloutier, Falls Church,
VA (US)

(73) Assignee: Bell Atlantic Network Services, Inc.,
Arlington, VA (US)

( * ) Notice: Subject to any disclaimer, the term of this patent is extended or adjusted under 35 U.S.C. 154(b) by 0 days.

(21) Appl. No.: 09/141,726

(22) Filed: Aug. 27, 1998

(51) Int. Cl.[7] .............................................. H04L 12/66
(52) U.S. Cl. ........................ 370/352; 370/356; 713/201
(58) Field of Search ................................. 370/351–356, 370/229, 230.1, 235, 254, 389; 709/220–225, 232–235; 713/200, 201, 100; 708/300, 819

(56) References Cited

U.S. PATENT DOCUMENTS

| | | | |
|---|---|---|---|
| 4,538,259 A | | 8/1985 | Moore |
| 5,606,668 A | | 2/1997 | Shwed |
| 5,608,786 A | | 3/1997 | Gordon |
| 5,724,355 A | | 3/1998 | Bruno et al. |
| 5,726,984 A | | 3/1998 | Kubler |
| 6,009,475 A | * | 12/1999 | Shrader ...................... 709/249 |
| 6,088,796 A | * | 7/2000 | Cianfrocca et al. ......... 713/152 |
| 6,243,815 B1 | * | 6/2001 | Antur et al. ................ 713/201 |

* cited by examiner

Primary Examiner—Ajit Patel
(74) Attorney, Agent, or Firm—Rader, Fishman & Grauer PLLC (57) ABSTRACT

A system and method for conducting a voice communication through a hybrid network which includes a packet internetwork, such as the Internet, connected to a circuit switched telephone network. The packet internetwork is connected to the switched telephone network through a static filter device, a packet switch, and a telephone network controlled gateway. A control processor is connected to the packet switch and to the filter device. The filter device generates a real time copy of call set up signaling dialog between the party requesting connection and the gateway which passes through or to the filter device. This duplicate of set up signaling is delivered from the filter device through the packet switch to the control processor. The control processor generates therefrom a filter device control signal which specifies the filter parameters derived from the set-up signaling dialog. This filter device control signal is delivered to the filter device and reconfigures the filter device to set filter parameters which are customized to the specific communication. The filter device thereupon filters the conversation stream of packetized voice.

33 Claims, 5 Drawing Sheets

REAL TIME FIREWALL SECURITY

FIELD OF THE INVENTION

This invention relates to methods and systems for managing security in communication sessions across networks, and more particularly, to a methodology and system for managing security in telephony sessions over hybrid networks such as combined switched telephone networks and packet switched internetworks, such as the Internet. In one aspect the invention relates to an improved firewall mechanism and methodology for providing real time firewall security.

BACKGROUND OF THE INVENTION

In providing a gateway between a secure network, such as a switched telephone network, and an unsecured network, such as the Internet, the protection and maintenance of network security immediately becomes a concern. Protecting a secure network from unauthorized use or attack is of paramount importance to any organization. When the secure network constitutes the public switched telephone network (PSTN) the seriousness of the threat is self-evident.

The potential development of telephony over the Internet technology as a viable commercial telephony service has attracted interest by both equipment and software vendors and long distance and local exchange carriers. However, the commercial opportunity carries with it the problem of maintaining network security. Connectivity and security are two conflicting objectives in any computing environment. In the context of providing telephone service over the Internet the basic problem of minimizing latency assumes even larger importance.

In communicating with essentially real time applications such as telephony via packets, there is a need for both consistency and speed. The packets must arrive on a consistent basis and they must arrive quickly. Generally speaking, when any type of security scheme is implemented, some latency or inconsistency is introduced into the data stream. When a very limited number of streams are involved the problem is manageable. However, as the number of streams starts increasing, it is much more difficult to provide adequate security at an acceptable cost without introducing quality of service problems.

An acceptable response to the problem of access control must be effective, economical, and transparent to users. Packet filtering is a method which allows connectivity yet provides security by controlling the traffic being passed, thus preventing unauthorized communication attempts and attacks upon the protected network. Current implementation of packet filtering allows specification of access list tables according to a fixed format. This lacks flexibility and entails excessive expense when the firewall is designed to cope with the problems presented in packetized voice.

U.S. Pat. No. 5,606,668, issued Feb. 25, 1997, to Gil Shwed, for a System for Securing Inbound and Outbound Data Packet Flow in a Computer Network, proposes one solution. According to the Shwed patent there is provided a system administrator having a graphical user interface (GUI) for entering security rules. FIG. 3 of that patent illustrates the computer screen upon which the system administrator depends. Network objects and services are two of the aspects of the network which must be defined by the administrator.

The monitor computer screen is used to define network objects such as workstations, gateways, and other computer hardware connected to the system. Various devices are grouped together such as, for example, the finance department, the research and development department, and the directors of the company. This is intended to provide flexibility in tailoring security rules to manage various filters to provide the degree of access desired for the various computers or the devices which are grouped together. It is thus possible to have the chief financial officer as well as other higher-ranking officials of the company, such as the CEO and the directors, able to communicate directly with the finance group, but filter out communications from other groups. This allows the administrator or system operator to provide internal security as well as external security.

Network services are also represented on the screen from which the administrator or operator works. Graphic symbols and color are utilized to ease the burden on the operator. This makes it possible for the operator to enter new rules without the need for writing, compiling and checking new code for this purpose. The information entered on the GUI is then converted to a filter script containing the rules to be utilized by the packet filter.

While the system described in the Shwed Patent may be effective for its intended purpose, it requires the service of an operator at the computer terminal, and does not provide the flexibility and speed necessary for handling security desired at the junction of the Internet and a switched telephone network.

Another possible approach to the problem which has been suggested is the use of a proxy server or proxy application for purposes of providing a firewall. However, while this might be considered for a very low number of users, latency increases exponentially as the number is increased. Application proxies would not be capable of handling the number of calls expected in this application except at a prohibitive cost.

SUMMARY OF THE INVENTION

It is an object of the invention to provide an improved system and method for implementing security for a telephone network in a telephony over the Internet application.

It is another object of the invention to provide network security to a secured network connected to an unsecured packet network for providing audio and/or video service.

It is still another object of the invention to provide a mechanism and method for implementing improved firewall functionality.

It is another object of the invention to provide real time security that is dynamic and changes and adapts to conditions.

It is a further object of the invention to provide protection to a switched telephone network which is interfaced to an unsecure packet network, such as the Internet, for implementing audio or video communication.

It is another object of the invention to provide an improved firewall mechanism for filtering packetized voice signaling to enforce conformance to automatically created filter parameters which are customized on a per-conversation basis.

It is still a further object of the invention to provide a system for conducting a voice communication through a hybrid network which comprises a packet internetwork connected to a switched telephone network via a static filter device, a packet switch, a gateway, and a control processor connected to the packet switch and to the filter device, wherein the filter device generates a real time copy of call set up signaling therethrough, which copy of set up signaling is delivered through the packet switch to the control processor, with the control processor generating therefrom a filter device control signal which is delivered to the filter device and which reconfigures the filter device.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations.

BEST MODE FOR CARRYING OUT THE INVENTION

Copending application Ser. No. 09/014,286, filed Jan. 27, 1998, of Voit, et al., for Inbound Gateway Authorization Processing for Inter-Carrier Internet Telephony, discloses a series of embodiments of hybrid packet switched internetworks (such as the Internet)/switched telephone networks (such as a PSTN) systems, for conducting packetized voice communications. That application is assigned to the owner of the instant application and is incorporated by reference herein in its entirety.

Figure 1:
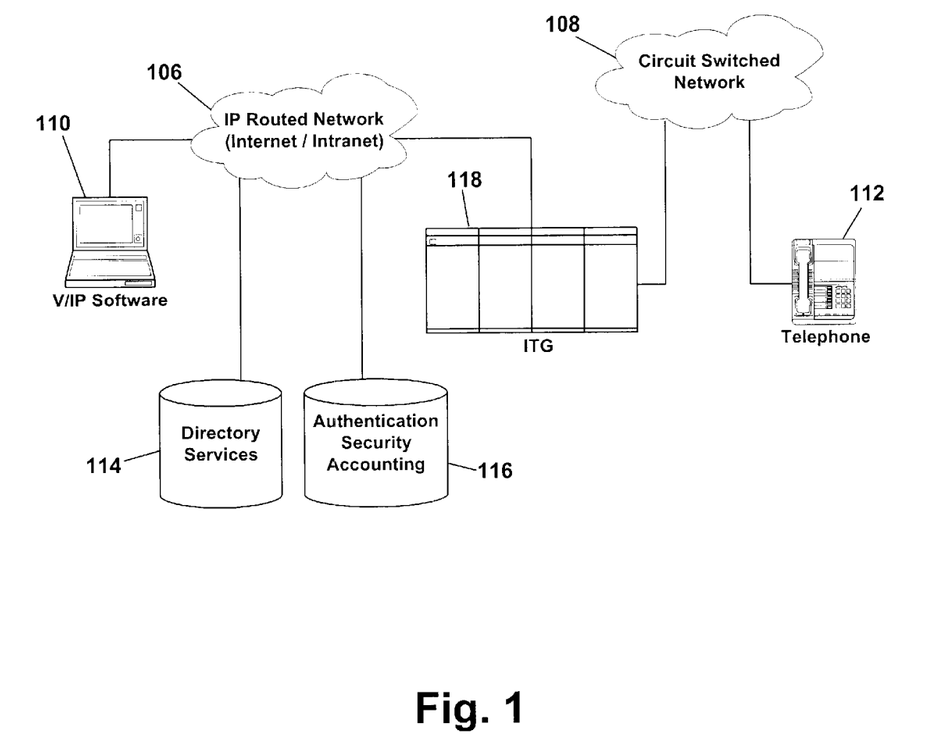
FIG. 1 is a high-level functional block diagram of a telephone network arranged to provide connectivity to a computer through the Internet.

FIG. 1 shows a simplified version of one embodiment of such a network. In FIG. 1 packet switched and circuit switched networks are separately shown as the clouds 106 and 108. In this figure the end-to-end system connects a laptop computer 110 and a telephone 112. These constitute what is here referred to as the PC user call control object and the POTS (Plain Old Telephone Service) user.

A directory or directory services object 114 and an authentication and security accounting object 116 are coupled to the packet switched IP routed network 106. These constitute a directory which matches called party exchange numbers (NPA-NXX) to IP addresses of gateways which serve the respective exchange numbers. The authentication and security accounting object 116 comprises a database handling authorization, usage recording and pricing, as presently described.

An Internet Telephony Gateway or ITG server 118 connects the packet switched and circuit switched networks. This may be sometimes referred to herein as the call control object. The computer 110 may be linked to the packet switched network via any available computer to Internet link. Similarly the connection between the circuit switched network and the telephone terminal may be any of the conventional links including POTS.

The database 116 represents the network element used in this architecture to perform customer authentication, call authorization, usage accounting, and usage pricing. The authentication database 116 is accessed by the gateway 118 during a call set up when the gateway receives an authorization request from a service subscriber. Communication between the gateway and the database is preferably encrypted and secure. The authorization request relayed by the gateway to the database 116 typically consists of an account number and password provided by the PC User. The authentication database 116 checks the account password and available account balance. If the password is correct and the account remaining balance permits the call to be established, then the database responds affirmatively to the gateway. The authentication database 118 also retains data indicating that a call associated with that account is in progress.

The operation of the system in establishing a call connection may be described as follows: The actual call set up signaling flow starts at the point where the user has established IP layer connectivity with the network, and has invoked the voice over Internet (V/IP) software application. This preliminary procedure typically entails the following steps by the party initiating the call:

1. The customer will boot the PC, and connect to the IP network following their existing procedures for network access.

2. The customer will launch their V/IP application, either as a plug-in to an existing browser or as a standalone application. When launched, this application will present a template of fields which are required to initiate a call.

3. The customer will populate a "telephone number to be called" data field. The customer will also either populate his/her account number and password, or the application will reapply this data if it has been previously saved within the application.

4. The customer will then initiate the call. During the call, the call's completion status will be presented in real-time to the user by the application (via a visual display).

One example of the call initiation procedure is now described.

1. The PC user initiates a call via the PC's voice over IP (V/IP) software. This software application invokes the directory 114 to obtain the IP address of the destination gateway. Based on the dialed number submitted by the PC application as described in the foregoing preliminary procedure, the directory 114 returns the IP address of the associated gateway 118.

2. The PC's V/IP software application invokes the gateway 118 to set up a call by passing to the gateway the number to be called, the user's account number, and a password.

3. The gateway invokes the authentication database 116 in order to receive authorization to proceed with the call. The authentication database will pass the authorization information back to the gateway.

4. If authorization was successful, the gateway will establish the PSTN connection, and notify the client software that the call is proceeding.

5. After the call has been established, the PC will respond to the network that it recognizes that a connection has been established. Timing of the call's duration can be initiated, and any usage measurements will indicate that the call is billable.

6. Steady state call.

Figure 2:
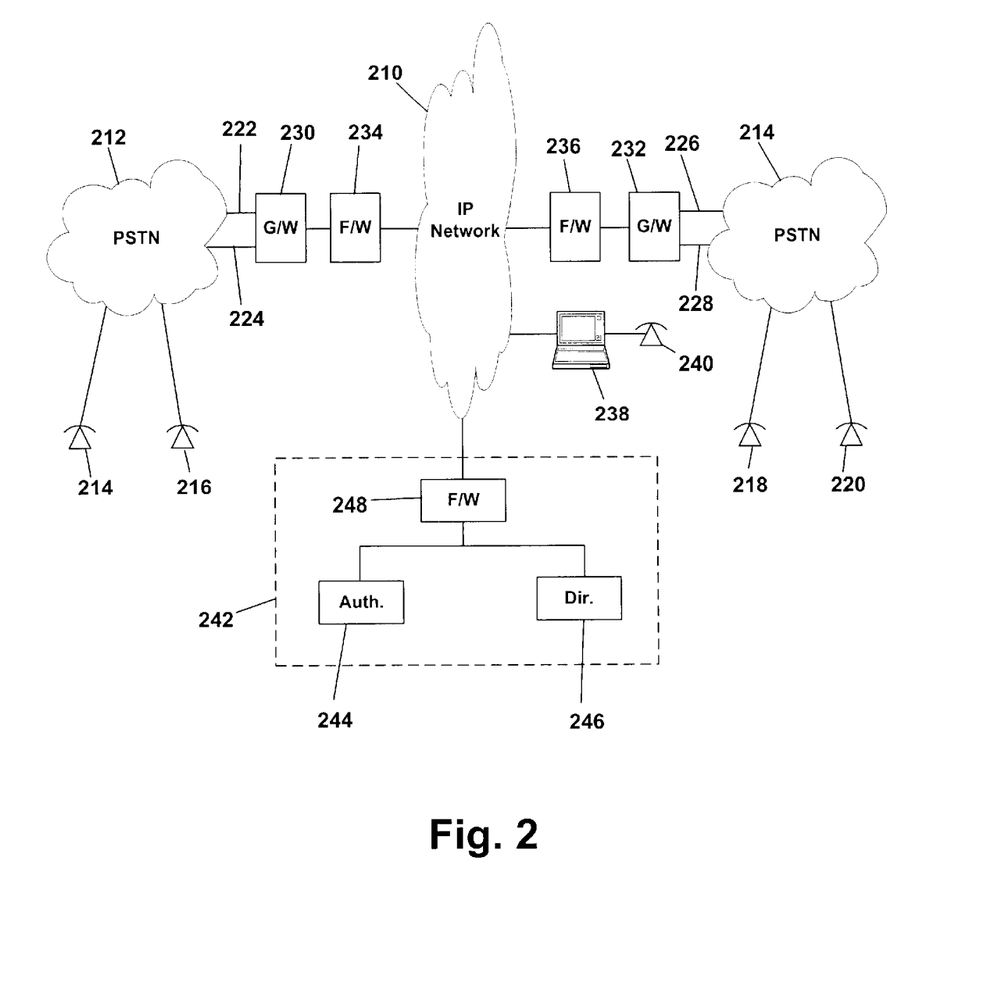
FIG. 2 is a high level diagram of basically the same network as shown in FIG. 1, which has been provided with firewalls.

Referring now to FIG. 2 there is shown a high level diagram of basically the same network as FIG. 1, which has been provided with firewalls.

Referring to FIG. 2, there is shown at 210 a cloud which represents a packet switched IP internetwork, such as the Internet. At opposite sides of the Internet cloud are geographically spaced switched telephone networks (PSTNs) 212 and 214, also shown as clouds. The telephone networks contain end offices (not separately shown) which serve subscribers 214, 216, 218, and 220. The subscribers may be served with plain old telephone service (POTS). The telephone networks 212 and 214 are respectively connected to the Internet via T-1 or primary rate ISDN links 222, 224 and 226, 228, gateways or servers 230 and 232, and firewalls 234 and 236. A computer or PC 238 is connected directly to the Internet. The PC is equipped with a headset and microphone or a telephone handset 240.

A control center 242 is shown by broken lines as including an authentication database 244 and directory database 246. These are connected to the IP network through a firewall 248.

This arrangement may be used to provide voice paths through the IP network from telephone to telephone or computer to telephone or vice versa. Without the addition of the firewalls, the establishment of a voice path from the computer to one of the telephones would be as just described with respect to FIG. 1.

Figure 3:
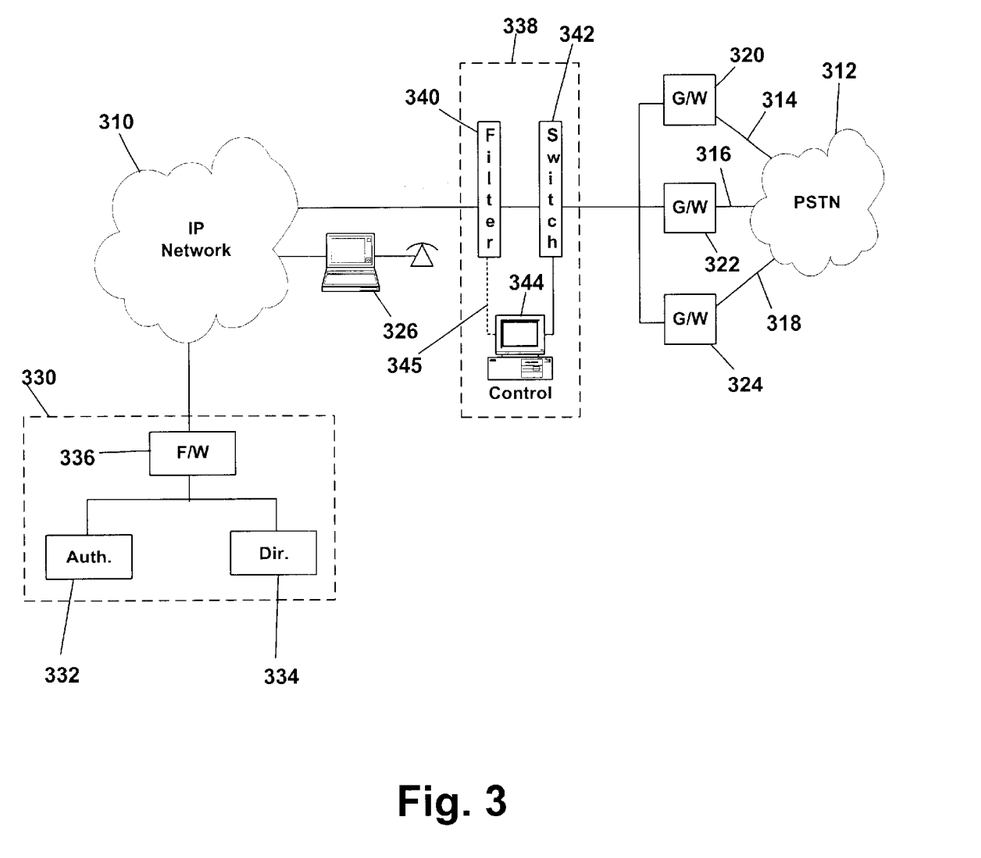
FIG. 3 is a detailed depiction of a firewall mechanism according to one preferred embodiment of the invention.

Referring to FIG. 3 there is shown a detailed depiction of a firewall mechanism according to the invention. In that figure an IP network, which may be the Internet, is shown by cloud 310 linked to a switched telephone network, which may be a PSTN 312. The telephone network is connected by T-1 or PRI ISDN links 314, 316, and 318 to gateways or servers 320, 322, and 324.

The IP network 310 has connected thereto a computer or PC 326 having a telephone 328. Also connected to the IP network is a control center indicated by the broken lines 330. As in FIG. 2, the control center includes an authorization database 332 and a directory database 334. The two databases are connected to the IP network through a firewall mechanism 336, presently to be described in detail.

The IP network 310 is connected to the gateways 320, 322 and 324 through a firewall mechanism 338 constructed according to a preferred embodiment of the invention. The firewall mechanism includes a static firewall router 340. This may be, for example, a BorderGuard 2000 Internet router for providing firewall protection. The BorderGuard 2000 is marketed by StorageTek—Network Systems Group, and is also available from Mercury Technology Services, Inc., a Florida based company. The static firewall 340 is connected to a hub packet switch 342. The switch may be, for example, an Ethernet packet switch such as the standard Cisco 1900 marketed by Cisco Systems, Inc. The firewall 340 and the switch 342 are connected to a control processor 344.

In the operation of the firewall mechanism shown in FIG. 3 the firewall router operates in a static bridged mode. A router typically operates in a manner to do some routing at the third layer of the OSI stack. In the instant firewall mechanism of a preferred embodiment of the invention, routing at the third layer is not desired because it incurs an unacceptable amount of latency. According to a preferred embodiment of the invention, the unit takes the signal only up to the second or network layer. The static firewall acts as a rule based packet filter. However according to the invention the rules are automatically and dynamically set. There is no requirement for an administrator periodically setting up detailed lists. The security is applied to each port on the fly to provide extremely fast operation, in sharp contrast to that which would be obtained from a proxy server.

The methodology provides the generation and application of customized filters for each conversation. Each filter is unique to a specific conversation. The filter disappears on termination of the conversation. As a result a high level of security is obtained. This is effected automatically in dynamic fashion which permits very fast response. As a result, the system provides an acceptable level of security for packetized voice communication.

In operation of the firewall mechanism of the invention, the static rule filter or firewall 340 replicates or copies the signaling which occurs during set up of a communication path. The ability to perform such copying is a little used functionality which exists in conventional static firewalls, such as the BorderGuard 2000. The two data streams which are produced, i.e., the original data stream and the replicated or copied stream, are then delivered to the packet switch 342. The switch passes the original stream to the addressed gateway 320, 322, or 324. At the same time the switch delivers the replicated stream to the control processor 344.

The control processor monitors and analyzes the set up signaling which follows. It derives from that signaling critical parameters which thereafter are used to govern the ensuing conversation. These parameters include but are not limited to source and destination, IP addresses, packet size and protocol, codec, format, gateway and port. The control processor then compiles a filter code from those parameters, and sends the filter code via an RS 232 link 345 to the static rule governed filter or firewall 340. The control processor 344 need not conduct constant surveillance of the conversation stream which passes through the firewall after the set up is complete and the communication link has been established.

The establishment of a typical communication link through the firewall mechanism may be described as follows:

The PC 326 is booted, runs its voice over Internet application, and connects to its connection or entry server (not shown) to the Internet. Using its voice over Internet application, the PC dials a telephone number and indicates a desire to make an Internet telephony call to that number. As previously described, this dialing is effected by the PC caller populating appropriate fields in the voice over Internet application. Also based on this information, the PC 326 connects to the authorization platform 332, presents its request and is authenticated and registered. The directory database 334 is then accessed for the IP address of the gateway serving that exchange and number. The directory database provides the IP address of the server 324 which serves that number, and which can serve as a hop-off gateway to leave the Internet for the telephone network.

The PC application notes that address, and uses it to send a Q.931 message to set up a conversation. The Q.931 message reaches the static firewall 340 which has only one port open for Q.931 messages. The firewall checks the message to confirm that it is a valid Q.931 stream. If it is not, it is dropped and a message sent back to the client PC saying that the host or gateway is unreachable. If it is a valid Q.931 stream, has the Q.931 port address in the firewall 340, and has the IP address of the gateway 324, the static firewall 340 commences replication of the signaling stream. Both the original stream and the replicated stream are now passed on to the packet switch 342.

The packet switch sends the replicated copy of the steam to the control processor 344. At the same time the packet switch sends the original stream to the gateway 324.

The control processor analyzes the replicated stream, notes that it has a request, where it originated, and that it is an H.323 over Q.931 set up signal, and registers this. H.323 is a specification recommendation which covers the technical requirements for multimedia communications systems in those situations where the underlying transport is a packet based network (PBN) which may not provide a guaranteed Quality of Service (QOS). These packet based networks may include Local Area Networks, Enterprise Area Networks, Metropolitan Area Networks, Intra-Networks, and Inter-Networks (including the Internet). They also include the dial-up connections or point-to-point connections over the GSTN or ISDN which use an underlying packet based transport such as PPP. Q.931 is the message oriented signaling protocol originally specified for operation over the ISDN D-channel. H.323 uses a subset of Q.931 to set-up and take down a communication channel between two H.323 devices. The protocol defines what goes into a signaling packet and defines the message type and content. Included are call setup and take down, called party number, calling party number information (including privacy and authenticity indicators), bearer capability (to distinguish, for example, voice versus data for compatibility check between terminals), release of B-Channels and the application and/or announcements in the originating switch upon encountering errors.

The gateway 324 consults its authorization database, notes that it has a valid customer and sends a negotiation message back to the PC 326. The message contains the proposal of the gateway for a codec and port. This passes through the firewall 340 and the firewall replicates the message and sends it to the control processor 344. The control processor reads and analyzes the replicated message, notes the codec and port, and notes that the gateway has authorized the call.

The acceptance message is received at the gateway 324, is read by the gateway, and the gateway returns an acknowledgement to the caller via the switch 342 and firewall 340. This is replicated by the firewall to the control 344 processor. The control processor looks at the replicated stream and registers that a valid conversation has been established on a designated port.

The control processor now generates a set of security specifications, compiles a filter configuration message, and sends this to the filter or firewall 340 via the RS 232 connection 345. The firewall now sets up a very specific filter for this single conversation. The filter will include source and destination, IP addresses, packet size and protocol and port. The firewall reconfigures in accord with RS 232 reconfiguration message it received from the control processor. The firewall filter now monitors every packet that follows for conformance with the strict filter requirements. The control processor drops out and turns to other set-ups.

The conversation path is established on the designated port and continues until a fault occurs and it is dropped by the firewall, or until one of the parties hangs up.

The PC 326 receives the message and ascertains that it can use the proposed codec and port. The PC now responds to the gateway, expressing agreement to the proposed specifications. This response from the PC arrives at the static firewall 340. It is checked again for format and protocol and is confirmed as having a valid format and protocol. The firewall passes the PC acceptance or agreement message through to the gateway 324 and sends a replicated copy to the control processor.

Figure 4A:
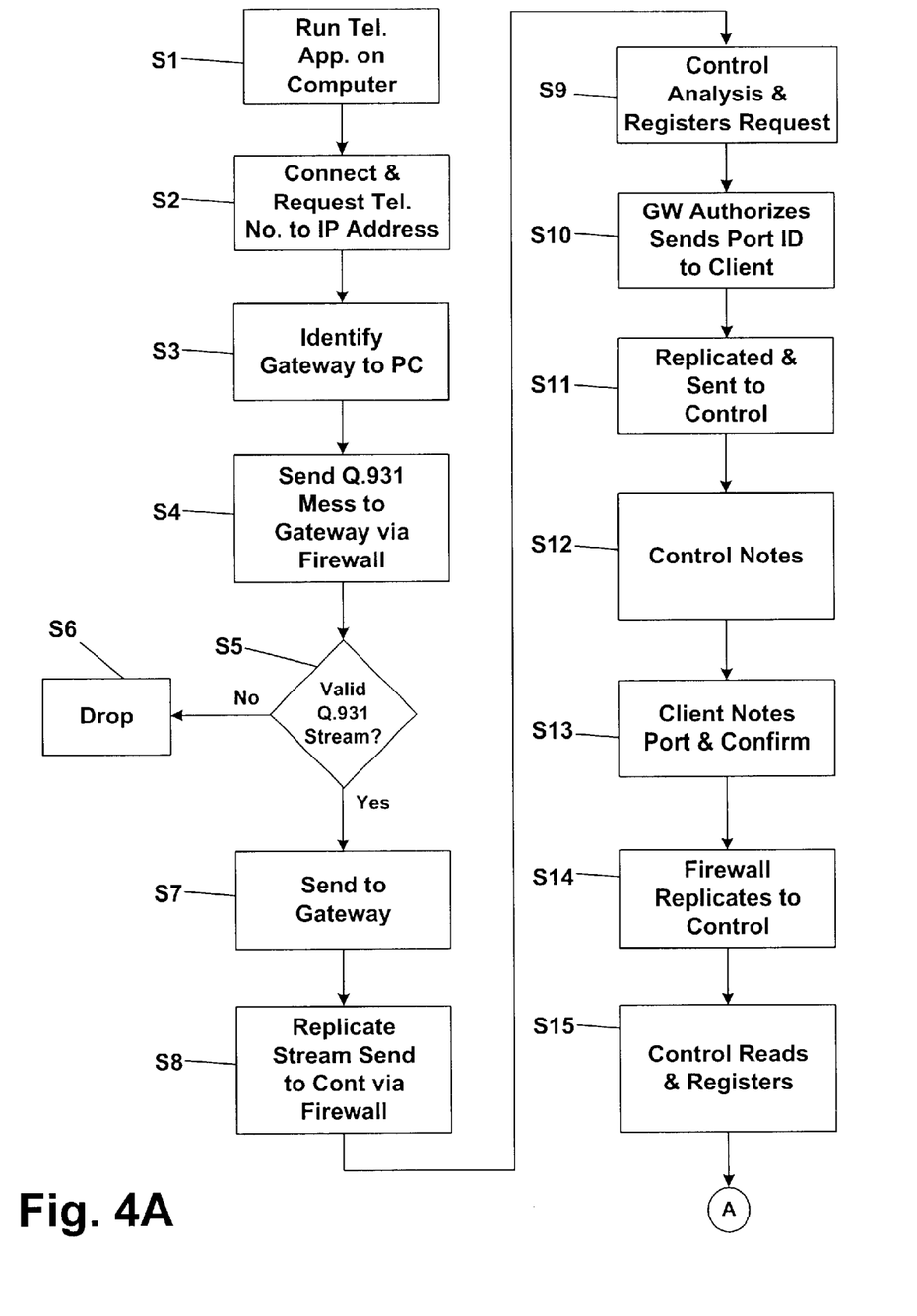
FIG. 4 is a flow diagram depicting a sequence of operation for the hybrid network shown in FIGS. 2 and 3.
Figure 4B:
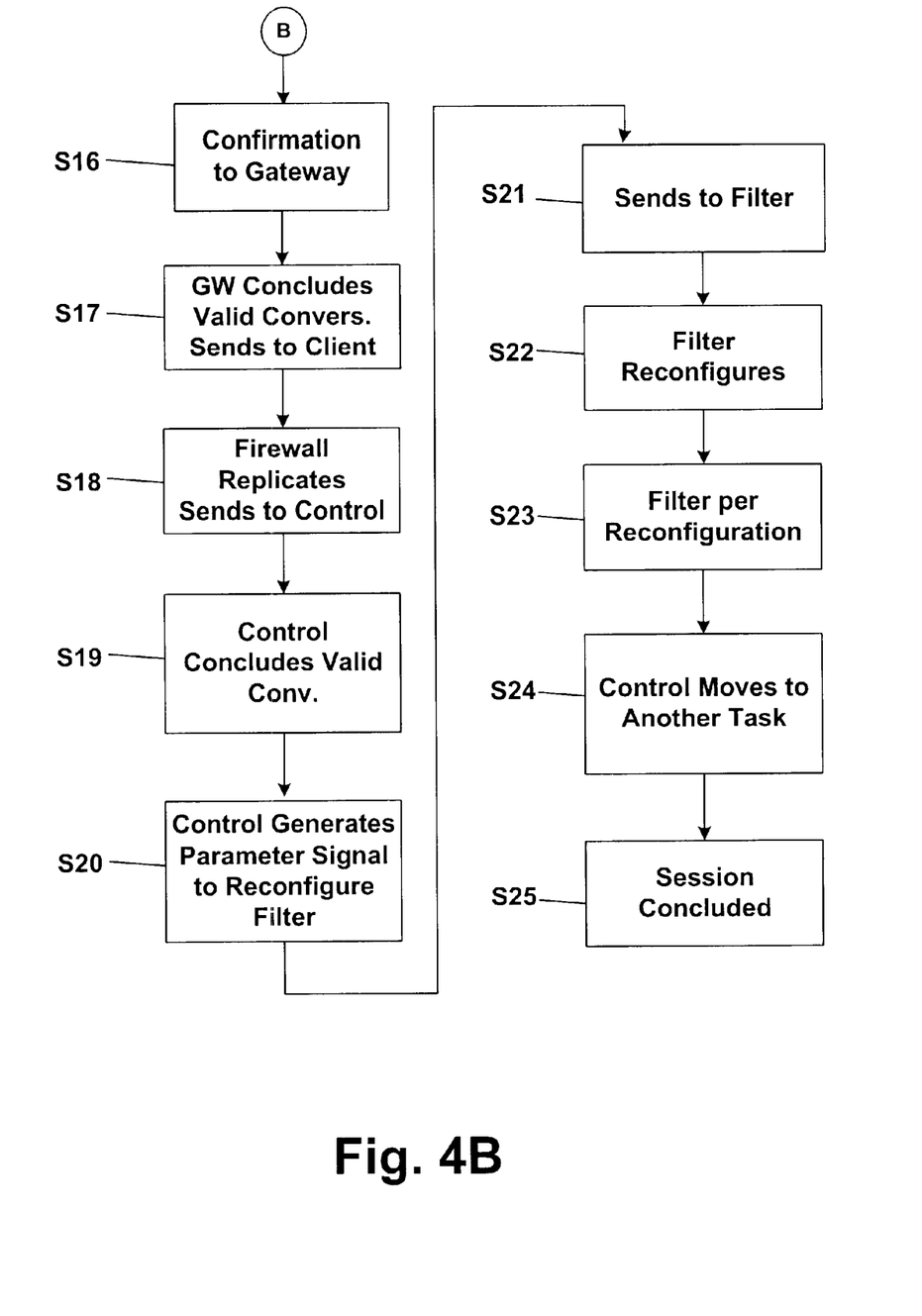

The method is illustrated in the flow chart shown in FIG. 4. Referring to that figure, in the first step (S1) the caller having a computer or PC equipped with a telephone and a telephony application, boots the computer and runs the telephony application to make a telephone call via the Internet.

At S2 the caller connects to its Internet connection server and signals a request to place a call to a telephone number and the IP address for that number.

The connection gateway responds at S3, consults the directory database 334 to which it has access, identifies the destination gateway which handles that number, and provides to the caller the IP address of that gateway.

At S4 the caller transmits its Q.931 message addressed to that gateway.

At S5 the transmitted Q.931 message arrives at the static firewall and it is checked to confirm that it is a valid Q.931 stream. If it is not a valid Q.931 stream, the message is dropped and a message is sent back to the caller saying that the host is not available (S6).

The message which arrived at the firewall, being a valid Q.931 message, is sent to the open Q.931 port. If it has the port ID, and the gateway or server IP address, it is passed through the firewall to the gateway at S7.

At S8 the firewall generates a copy of the incoming packets and routes that to the control processor through the switch 342. There are now two identical streams of packets, one going through the firewall to the switch and then to the gateway, and one routed from the firewall to the switch and from there to the control processor.

At S9 the control processor 344 analyzes the stream and registers that there has been a request.

At S10 the other or main packet steam from the switch arrives at the addressed gateway 324. The gateway consults its authorization database, such as the database 332, notes that it has a valid customer or client and sends a call set up negotiation message back to the caller PC 326. The set up message contains the proposal of the gateway for a codec and port.

This set up negotiation message goes to the firewall 340 through the switch 342. The firewall 340 replicates the message and sends it to the control processor 344 through the switch 342. This is shown at S11.

At S12 the control processor notes the message protocol and other parameter information which it extracts from the form and content of the message.

At S13 the caller PC notes the port assignment, codec and other parameter information in the message and sends an acceptance and agreement message back to the gateway.

At S14 the firewall replicates that confirmation to the control processor.

The control processor receives the message from the caller PC at S15, notes and registers that there is agreement.

At S16 the firewall sends the confirmation message on to the gateway.

At S17 the gateway concludes that there is an authorized, agreed upon, and valid conversation or communication setup. The gateway thereupon sends its confirmation and proceed message back through the switch and firewall to the caller PC.

The firewall replicates the proceed message from the gateway and sends the replication to the control processor at S18.

At S19 the control processor notes and registers that the gateway authorization and proceed signals have been received, and registers that a valid conversation has been cleared for the designated port using the designated codec.

The control processor, based on the information it has gathered in this setup message exchange, compiles the specific parameters which characterize and are to govern this single conversation. The control processor generates a filter configuration message. This is shown at S20.

At S21 the control processor sends an RS 232 message to the firewall to change its configuration in accord with the parameters compiled from the creation of this communication.

The firewall now is reconfigured pursuant to the signal from the control processor at S22.

The reconfigured static firewall now checks each of these parameters for every packet in the stream to the port designated for this communication. This is shown at S23.

The control processor drops out and goes on to other tasks at S24.

At S25 one or the other of the parties goes on hook and the session is concluded.

In the foregoing description of the invention the control processor has been depicted as operating according to a preferred mode of the invention. However, it is also possible to use the control processor in a modified manner wherein additional functions can be performed. For example, the firewall can be set to duplicate dropped packets to the control processor. The control processor can then provide a notification to an administrator that an attack is occurring from an identified sub-net. The control processor can trigger other programmed reactions. An alarm message can be delivered, the packet can be logged, or the firewall can be told to shut down.

In the preferred mode the control processor or controller is used as an off-line controller. In this manner the controller does not have to monitor a conversation or conduct continuous surveillance. It operates on a replicated stream only during setup for port negotiation, and provides very dynamic capabilities. The combination provides very fast operation and contributes virtually no latency to the communication stream. It provides security in a very real time sense. All of the specific parameters are set in the static and passive filter on-the-fly. The filter then provides full time filtering on a very specific set of specifications or rules which are customized for each communication path and set in the firewall in virtual real time. The arrangement not only provides dynamic port allocation but also provides dynamic set up of customized filter rules on-the-fly.

In this manner the control processor or controller is able to handle calls seriatim on an extremely fast basis. Once a set up dialog of signaling is complete the controller is free to move to another task, including the set up of another communication path.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of conducting an analog to analog communication between an originating terminal and a terminating terminal through a packet switched network coupled to a switched telephone network via at least one gateway wherein said terminating terminal is coupled to said switched telephone network; comprising:

establishing a static filter device between said gateway and said originating terminal;

transmitting through said filter device to said gateway a request for the establishment of a communication path through said gateway and through said telephone network to said terminating terminal;

engaging in a signaling dialog between said originating terminal and said gateway through said filter device;

generating a real time copy of at least a portion of said signaling dialog;

creating a filter device control signal containing parameters derived from said dialog;

configuring said filter device pursuant to said filter control signal;

conducting said analog to analog communication between said originating terminal and said terminating terminal via packet signaling through said packet switched network and said filter device to said gateway;

filtering said packet signaling through the configured filter device and blocking packet signals that fail to conform to the configuration of said static filter created from said dialog.

2. A method according to claim 1 wherein said analog communication is a voice communication.

3. A method according to claim 2 wherein said packet switched network comprises the Internet.

4. A method according to claim 1 wherein said parameters include the identity of said originating and terminating terminals, the identity of a port in said static filter, and the protocol to be used in the communication.

5. A method according to claim 4 wherein said parameters are valid solely for the communication initiated with said dialog.

6. A method according to claim 5 wherein said parameters include Internet protocol (IP) addresses for said gateway and for a server by which said originating terminal accessed said packet switched network.

7. A method of conducting a voice communication between an originating terminal and a terminating terminal through a packet switched network coupled to a switched telephone network via at least one gateway wherein said terminating terminal is coupled to said switched telephone network; comprising:

establishing a static filter device between said gateway and said originating terminal;

transmitting through said filter device to said gateway a request for the establishment of a communication path through said gateway and through said telephone network to said terminating terminal;

engaging in a call set up signaling dialog between said originating terminal and said gateway through said filter device;

generating a real time copy of at least a portion of said set up signaling dialog;

creating a filter device control signal containing parameters derived from said set up dialog;

configuring said filter device pursuant to said filter device control signal;

conducting said voice communication between said originating terminal and said terminating terminal via packet signaling through said packet switched network and said filter device to said gateway;

filtering said packet signaling through the configured filter device and blocking packet signals that fail to conform to the configuration of said filter device created from said dialog.

8. A method according to claim 7 wherein said dialog utilizes Q.931 signaling protocol and H.323 packet standards.

9. A method according to claim 7 wherein said dialog includes the steps of accessing a storage to authenticate the originating terminal, providing the originating terminal with the packet switched network address of said gateway, setting at least a port parameter from said gateway, and authorizing commencement of said voice communication from said gateway.

10. A method according to claim 9 wherein said copying is in said filter device.

11. A method according to claim 7 including the steps of copying said voice communication packet signaling, and monitoring said copied packet signaling.

12. A method according to claim 7 wherein said originating terminal comprises a computer.

13. A system for conducting a voice communication through a hybrid network including:
   a packet internetwork;
   a switched telephone network connected to the packet internetwork via a static filter device, a packet switch, and a gateway, said telephone network including a central office switching system connected to a voice terminal; and
   a control processor connected to said packet switch and to said filter device; wherein said filter device generates a real time copy of call set up signaling therethrough, which copy of set up signaling is delivered through said packet switch to said control processor, said control processor generating therefrom a filter device control signal delivered to said filter device and reconfiguring said filter device.

14. A system according to claim 13 wherein said filter device is reconfigured solely for the single call for which the set up was performed.

15. A system according to claim 13 including an authorization database which is accessed by said gateway prior to said gateway authorizing a call set up.

16. A system according to claim 15 wherein said gateway accesses said authorization database via said packet internetwork.

17. A system according to claim 16 wherein said internetwork comprises the Internet.

18. A system according to claim 17 including a gateway address database which is accessed in an attempt to set up a voice communication through said hybrid network to obtain the internetwork address of said gateway.

19. A system according to claim 18 wherein said gateway address database is accessed via said internetwork.

20. A system according to claim 13 wherein said filter device control signal delivered to said filter device includes information identifying a calling terminal, a called terminal, and a port number assigned for conducting the voice communication.

21. A system according to claim 13 wherein, upon the reconfiguring of said filter device, said filter device commences generation of a real time copy of call set up signaling for a different call.

22. In a communication system comprising a packet internetwork, a switched telephone network connected to the packet internetwork via a static filter device and a gateway, and a control processor connected to said filter device;
   a method comprising:
      transmitting from said filter device to said control processor a real time copy of call set up signaling passing through said filter device,
      generating in said control processor a filter device control signal and delivering said filter device control signal to said filter device,
      reconfiguring said filter device in accord with said filter device control signal, and
      filtering through said reconfigured filter device a packetized voice communication signal.

23. A method according to claim 22 wherein said filter device control signal is delivered to said filter device substantially immediately upon completion of said call set up signaling.

24. A method according to claim 23 including the step of said filter device producing real time copy of call set up signaling for a different call through a different port substantially immediately upon its said reconfiguration for the first call through a first port.

25. In a communication system comprising a packet internetwork, a switched telephone network connected to the packet internetwork via a static filter device, a packet switch, and a gateway, and a control processor connected to said filter device;
   a method comprising:
      transmitting from said filter device to said packet switch duplicate streams of call set up signaling;
      switching one of said streams to said gateway and the other of said streams to said control processor;
      generating in said control processor a filter device control signal and delivering said filter device control signal to said filter device;
      reconfiguring said filter device in accord with said filter device control signal; and
      filtering through said reconfigured filter device the packetized voice communication set up by said set up signaling.

26. A method according to claim 25 including porting said set up signaling through a Q.931 port in said filter device.

27. A method according to claim 25 wherein said filter device is reconfigured solely for the single call for which the set up was performed.

28. A method according to claim 27 including the step of said gateway accessing an authorization database prior to said gateway authorizing a call set up.

29. A method according to claim 28 wherein said gateway accesses said authorization database via said packet internetwork.

30. A method according to claim 29 wherein said internetwork comprises the Internet.

31. A method according to claim 30 including the step of accessing a gateway address database in an attempt to set up a voice communication through said communication system to obtain the internetwork address of said gateway.

32. A method according to claim 31 wherein said gateway address database is accessed via the Internet.

33. A firewall device for providing protection of a network object to which said firewall device is connected, comprising a static filter device, a control processor, and a packet switch, said static filter device providing real time duplication of a packet stream passed therethrough and through said packet switch, said static filter device sending the duplicate packet stream through said packet switch to said control processor, said control processor sending a filter device control signal to said filter device based on information obtained from said duplicate packet stream causing said filter device to be reconfigured in accord with said filter device control signal.

* * * * *